US008042174B2

(12) United States Patent
Hattori

(10) Patent No.: US 8,042,174 B2

(45) Date of Patent: Oct. 18, 2011

(54) IMAGE PROCESSING DEVICE

(75) Inventor: Hiroshi Hattori, Gifu (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 885 days.

(21) Appl. No.: 12/034,980

(22) Filed: Feb. 21, 2008

(65) Prior Publication Data

US 2008/0201773 A1 Aug. 21, 2008

(30) Foreign Application Priority Data

Feb. 21, 2007 (JP) ................................. 2007-041095

(51) Int. Cl.
*G06F 13/00* (2006.01)
*G06F 3/12* (2006.01)

(52) U.S. Cl. ................ 726/20; 726/17; 726/18; 726/19; 358/1.1

(58) Field of Classification Search ............. 726/17–20; 358/1.1
See application file for complete search history.

(56) References Cited

U.S. PATENT DOCUMENTS

| | | | | |
|---|---|---|---|---|
| 2005/0068547 | A1* | 3/2005 | Negishi et al. | 358/1.1 |
| 2005/0190399 | A1 | 9/2005 | Nakaoka et al. | |
| 2006/0044609 | A1 | 3/2006 | Kato et al. | |
| 2006/0085524 | A1* | 4/2006 | Lee | 709/220 |
| 2006/0181729 | A1 | 8/2006 | Kuribara | |
| 2007/0255918 | A1 | 11/2007 | Suzuki | |
| 2008/0181650 | A1* | 7/2008 | Matsui | 399/80 |

FOREIGN PATENT DOCUMENTS

| | | |
|---|---|---|
| JP | 2002096715 A | 4/2002 |
| JP | 2005135097 A | 5/2005 |
| JP | 2005-216019 | 8/2005 |
| JP | 2005-219225 | 8/2005 |
| JP | 2006065778 A | 3/2006 |
| JP | 2006-168261 | 6/2006 |
| JP | 2006168206 A | 6/2006 |
| JP | 2006-224329 | 8/2006 |
| JP | 2006224329 A | 8/2006 |
| JP | 2006-244247 | 9/2006 |
| JP | 2007-300329 | 11/2007 |
| JP | HEI 11-053520 A | 5/2009 |

OTHER PUBLICATIONS

Notification of Reasons of Rejection for Japanese Application No. 2007-041095 mailed Feb. 17, 2009, 6 pages.

* cited by examiner

*Primary Examiner* — Kambiz Zand
*Assistant Examiner* — Michael Guirguis
(74) *Attorney, Agent, or Firm* — Banner & Witcoff, Ltd

(57) ABSTRACT

An image processing device is provide with an external storage which is detachably connectable to the image processing device, an inputting unit configured to allow a user to input user information, a registration unit configured to register ID information intrinsic to the external storage and the user information input through the inputting unit with registration data in a related manner, a permission unit configured to retrieve the ID information from the external storage and permit access to the external storage connected to the image processing device only if the retrieved ID information is included in the registered ID information which is registered with the registration data, and a data processing unit configured to read/write data from/to the external storage if access to the external storage is permitted by the permission unit.

15 Claims, 7 Drawing Sheets

PRINT LOG DATA

| USER INFORMATION | PRINT DATE / TIME | NUMBER OF COPIES |
|---|---|---|
| tokugawa | 06/07/08 10:50 | 5 |
| toyotomi | 06/07/08 11:35 | 4 |
| oda | 06/07/08 11:47 | 1 |
| tokugawa | 06/07/08 13:34 | 7 |
| kato | 06/07/08 18:28 | 3 |
| kato | 06/07/09 01:32 | 4 |
| tokugawa | 06/07/09 04:52 | 5 |

FIG. 8

IMAGE PROCESSING DEVICE

CROSS-REFERENCE TO RELATED APPLICATION

This application claims priority under 35 U.S.C. §119 from Japanese Patent Application No. 2007-041095 filed on Feb. 21, 2007. The entire subject matter of the application is incorporated herein by reference.

BACKGROUND

1. Technical Field

The following description relates to an image processing device capable of reading/writing data from/to an external storage which is detachably connectable to the image processing device.

2. Related Art

Conventionally, there has been known an image processing device capable of performing direct printing. The direct printing is a function of retrieving print data stored in the external storage detachably attached to the image processing device, developing the print data into generate image data (e.g., generating bitmap data), and printing images on recording sheets based on the developed image data. An example of such an image processing device is disclosed in Japanese Patent Provisional Publication No. 2006-224329.

When such an external storage is used, security protection of the data stored in the external storage is important. Typically, in order to protect the security, the external storage is connected to a host computer, and under control of the host computer, authentication data is stored in the external storage. When such an external storage is connected to an image processing device and data is handled between the image processing device and the external storage, a user is firstly required to input authentication data (e.g., password) to handle the data. Then, the image processing device compares the input authentication data and the authentication data preliminarily stored in the external device, and enables handling of data between the image processing device and the external storage only when the input authentication data coincides with the stored authentication data.

SUMMARY OF THE INVENTION

As described above, conventionally, in order to manage the authentication data, an external device such as the host computer is required. Therefore, management of the authentication data of each of individual external storages is troublesome since the authentication data should be stored in each external storage beforehand. Further, according to the above configuration, every time the user attempts to execute the direct printing, the authentication data must be input at the image processing device, which is also troublesome.

Further, if the direct printing is executed without management of the authentication data, it is very difficult to identify the user who executed the direct printing at a later stage. That is, if printing operation is automatically executed when the user attaches the external storage to the image processing device (i.e., the printing operation is started without requiring the user to input password and/or user name), it is impossible to record information regarding the user, date of print, file name, etc. Therefore, a printing log, money charging information and the like cannot be created.

In consideration of the above problem, the present invention is advantageous in that an improved image processing device is provided, with which users of the direct printing function can be restricted, while the printing log and the like can be created easily.

According to aspects of the invention, there is provided an image processing device to which an external storage is detachably connected. The image processing device is provide with an inputting unit configured to allow a user to input user information, a registration unit configured to register ID information intrinsic to the external storage and the user information input through the inputting unit with registration data in a related manner, a permission unit configured to retrieve the ID information from the external storage and permit access to the external storage connected to the image processing device only if the retrieved ID information is included in the registered ID information which is registered with the registration data, and a data processing unit configured to read/write data from/to the external storage if access to the external storage is permitted by the permission unit.

With the above configuration, only when the ID information assigned to the external storage is registered to the registration data stored in the image processing device. Therefore, external storages which can be used in the image processing device are effectively restricted. In other words, the number of the users can be restricted effectively. Further, based on the ID information assigned to the external storages, the print log can be created easily.

According to aspects of the invention, there is provided a method of processing data for an image processing device to which an external storage is detachably connectable. The method includes the steps of (a) allowing a user to input user information, (b) registering ID information intrinsic to the external storage and the user information input by the user with registration data in a related manner, (c) retrieving the ID information from the external storage and permitting access to the external storage connected to the image processing device only if the retrieved ID information is included in the registered ID information which is registered with the registration data and (d) processing data including at least one of reading and writing data from/to the external storage if access to the external storage is permitted.

According to further aspects of the invention, there is provided a computer accessible recording medium storing a program which causes a computer, when executed by the computer, to function as an image processing device to which an external storage is detachably connectable. When the program is executed, the computer operates as the image processing device described above.

BRIEF DESCRIPTION OF THE ACCOMPANYING DRAWINGS

Figure 7:
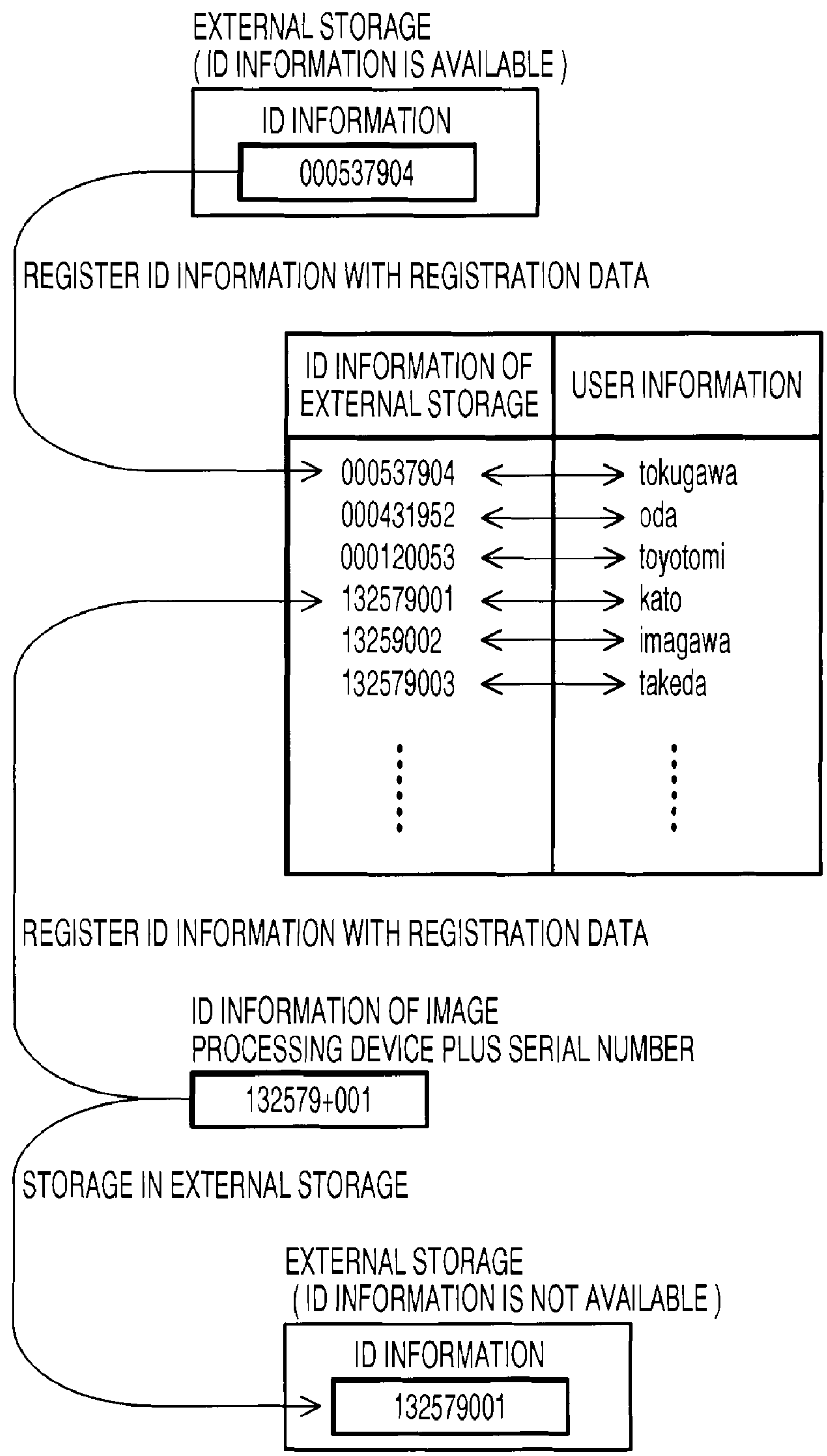

FIG. 7 schematically shows a data structure of registration data.

FIG. 8 schematically shows contents of print log data.

DETAILED DESCRIPTION OF THE EMBODIMENT

Hereinafter, referring to the accompanying drawings, an image processing device according to an embodiment will be described in detail.

Figure 1:
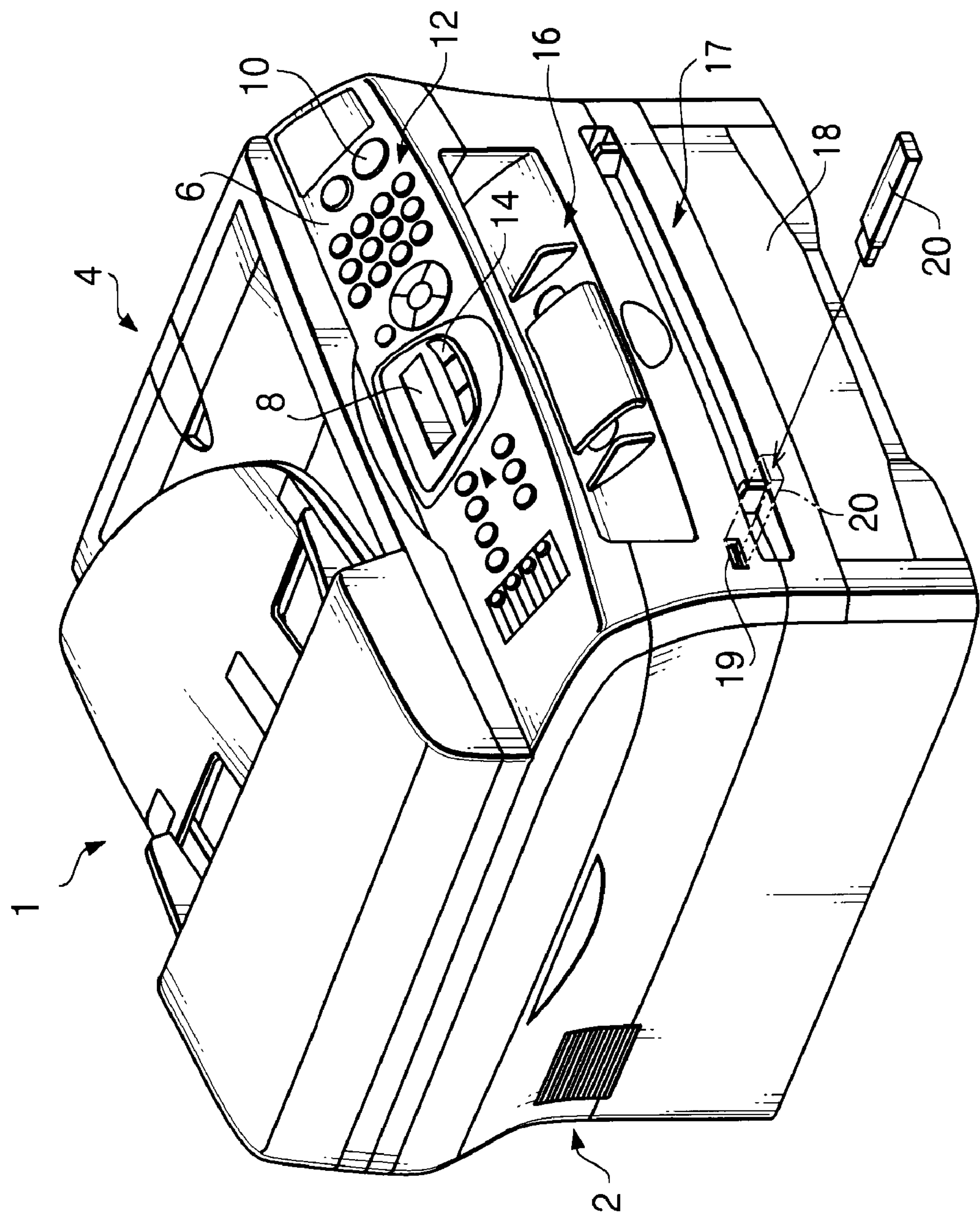
FIG. 1 is a perspective view of an image processing device according to an aspect of the invention.

FIG. 1 is a perspective view of an appearance of an image processing device 1 according to an embodiment of the invention. The image processing device 1 is a so-called MFP (Multi-Function Peripheral) having printer function, scanner function, and copier functions.

As shown in FIG. 1, the image processing device 1 is provided with an image forming unit 2 and an image scanning unit 4. On an upper surface of the image processing device 1, an operation unit 6 provided with a plurality of operable keys, a displaying unit 8 for displaying information on an LCD (Liquid Crystal Display) is provided. In particular, the operation unit 6 is provided with an execution key 10 which is operated to execute a selected function, ten keys 12 for inputting numerals, and function selection keys 14 for selecting one of the functions available to the image processing device 1.

Below the operation unit 6, a sheet pickup opening 16 communicated from a sheet discharge tray is formed. Below the sheet pickup opening 16, a manual sheet feed opening 17 which is a slit extending in a horizontal direction. Further, below the manual sheet feed opening 17, a sheet feed cassette 18 is provided. On a front surface of the image processing device 1, an insertion slot 19 to which the external storage 20 is detachably connected is formed.

Figure 2:
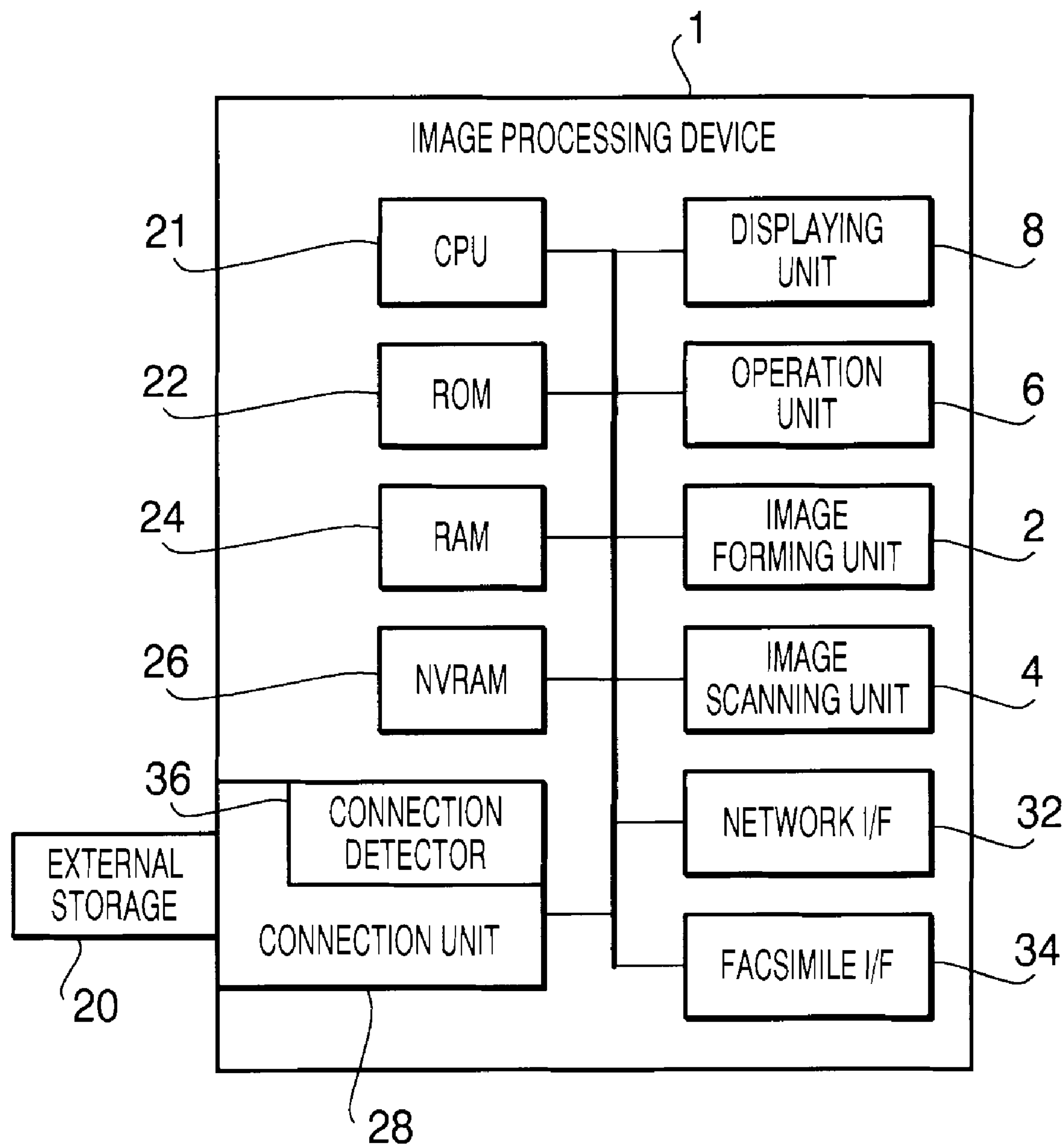
FIG. 2 is a block diagram showing an electrical configuration of the image processing device according to aspects of the invention.

FIG. 2 is a block diagram showing an electrical configuration of the image processing device 1. The image processing device 1 is provided with a CPU (Central Processing Unit) 21 which executes programs to control operation of the image processing device 1, a ROM (Read Only Memory) 22 storing various programs to be executed by the CPU 21, a RAM (Random Access Memory) 24 which temporarily stores data such as processing results, an NVRAM (Non-Volatile RAM) 26 which retains data even if power supply is off. The image processing device 1 further includes a connecting unit 28 to which the external storage 20 is connected, the operation unit 6, the displaying unit 8, an image forming unit 2 which is controlled by the CPU 21 based on the programs and forms images on the recording sheets, and a network interface 32 which is configured to connect the image processing device 1 to external devices such as a PC (Personal Computer) or the like through a network, and a facsimile interface 34 for connecting the image processing device 1 to the public telephone network. The above-described units are interconnected through a bus 34 such that data can be exchanged thereamong.

The connecting unit 28 is provided with a connection detecting unit 36 which has a well-known configuration for detecting connection/disconnection of the external storage 20 by monitoring signal level of a terminal, which is in a disconnected status when the external storage 20 is not connected to the connecting unit 28, while in a connected status when the external storage 20 is connected to the connecting unit 28.

According to the exemplary embodiment, the external storage 20 is a handy USB (Universal Serial Bus) memory provided with a non-volatile rewritable memory. The USB memory can be removably connected to the image processing device 1, that is, the external storage 20 can be removably connected to the connecting unit 28. It should be noted that the external storage 14 need not be the USB memory, but any medium which can be removably connected to the image processing device 1 and data can be retrieved therefrom or written therein. Thus, alternatively or optionally, a floppy Disk®, an external hard disk, magneto-optical disc drive, or a non-volatile memory card can be used as the external storage 20.

The printing operation is executed by the image forming unit 2 in accordance with a well-known electrophotographic imaging process. That is, a laser beam is ON/OFF modulated based on the image data and scanned within a predetermined angular range so that the surface of a photoreceptive drum, which is rotated, is scanned by the modulated laser beam (not shown) to form an electrostatic latent image. The latent image is then developed as toner is applied thereto, thereby a toner image is formed. The toner image is transferred onto a recording sheet which is fed from the sheet feed cassette 18. The toner image transferred on the recording sheet is fixed on the recording sheet, which is discharged and stacked on the discharge tray. As described above, the image forming unit 2 is configured as a so-called page printer, which forms a page of the image (toner image) on one page of the recording sheet. It should be noted that the invention need not be limited to this configuration (i.e., the electrophotographic imaging device), but can be of other types such as an inkjet type serial printer (i.e., not a page printer).

The image scanning unit 4 is configured such that an image of an original document which is placed on a glass plate is scanned by an image sensor through the glass plate.

The image processing device 1 generates the image data by developing print data, which is transmitted from an external PC via the network interface 32 and/or stored in the external storage 20, or a frame memory inside the RAM 24. The image data thus developed in the frame memory of the RAM 24 is transmitted to the image forming unit 2 as CMYK (Cyan, Magenta, Yellow and Black) data or K data (in case of greyscale image). The image forming unit 2 prints images represented by the image data on the recording sheet. The printing operation may be color printing or monochromatic printing.

The print data is, for example, PDL (Page Description Language) data or a predetermined printable format such as PDF, TIFF, or JPEG format data.

Figure 3:
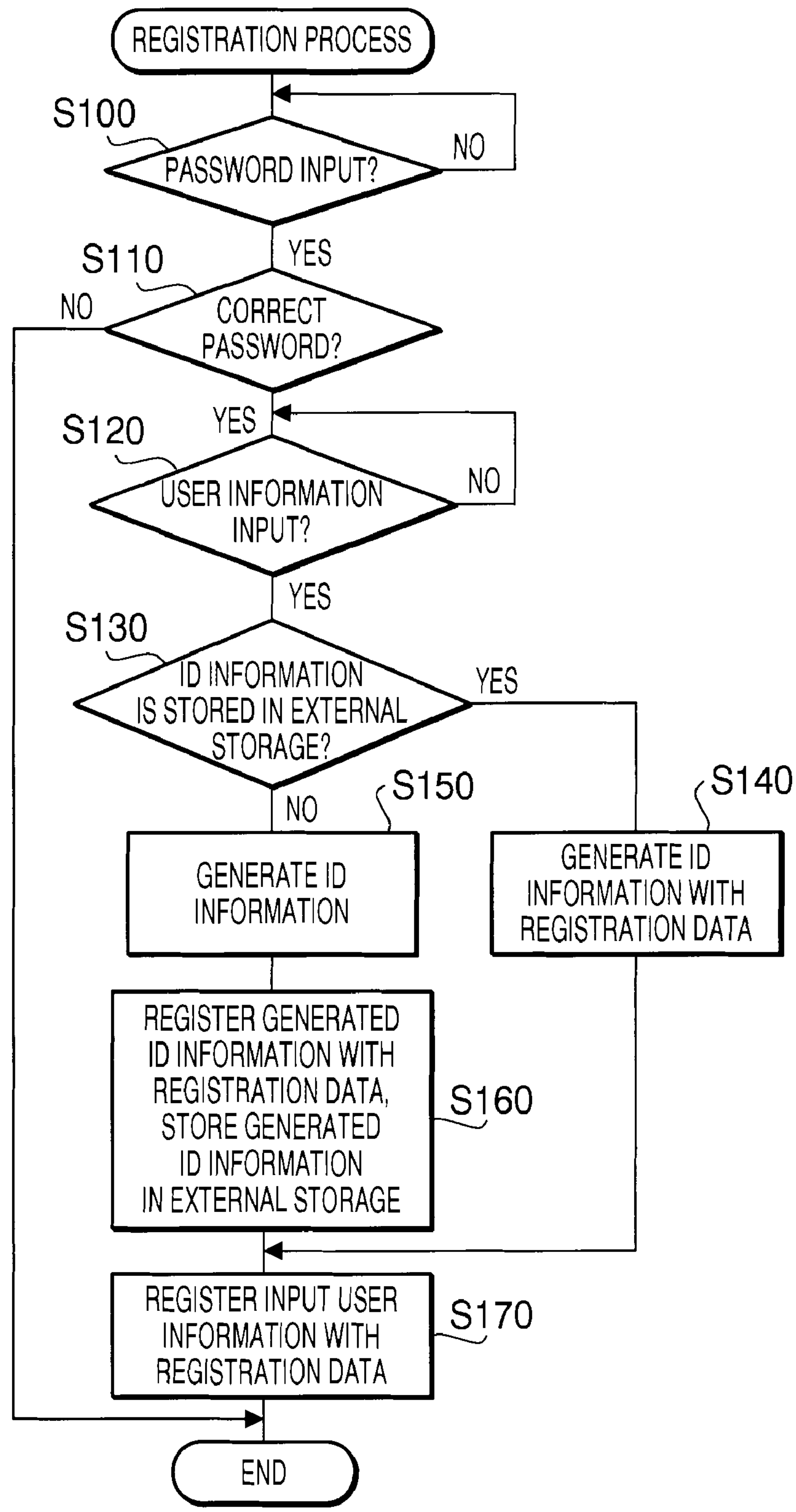
FIG. 3 is flowchart illustrating a registration process according to aspects of the invention.

Next, a registration process executed by the image processing device 1 will be described. FIG. 3 is a flowchart illustrating the registration process. The registration process is executed when a user operates the selection key 14 to select a "registration" menu from among functional menus displayed on the displaying unit 8 and then operates the execution key 10. It should be noted that the external storage 20 should be connected to the insertion slot 19 before the registration process is started.

When the registration process is started, the process displays a message requesting an administrator to input password, and judges whether the password is input (S100).

The process pauses until the password is input (S100: NO). When the administrator inputs the password (S100: YES), the process judges whether the input password is correct (S110). Specifically, a predetermined password has been stored in the NVRAM 26 of the image processing device in advance, and the process compares the input password with the password stored in the NVRAM 26. According to the embodiment, the password authentication is performed as above, and only the administrator who inputs the correct password can execute the registration process.

If the input password is incorrect (S110: NO), the process is terminated. If the input password is correct (S110: YES), the process displays a message requiring the administrator to input user information on the displaying unit 8, and pauses until the user information is input (S120). The ten keys 12 are used not only the numerals but alphabetical characters, symbols and the like, and the user information is input using the ten keys 12.

Until the user information is input (S120: NO), the process pauses at S120. When the user information is input (S120: YES), the process temporarily stores the input user information in the RAM 24, and judges whether ID information is stored in the external storage 20 (S130).

There exists external storages 20 which store information intrinsic to the external storage 20, respectively. Such information intrinsic to respective external storage 20 is different among a plurality of external storage 20, and thus, the information intrinsic to the external storage 20 can be used as the ID information for identifying the individual external storage 20.

If the ID information has been stored in the external storage 20 (S130: YES), the process registers the ID information of the external storage 20 with registration data stored in the NVRAM 26 (S140).

If the ID information is not stored in the external storage 20 (S130: NO), the process assigns a new ID information to the external storage 20. Specifically, the process generates the new ID information by combining ID information of the image processing device 1 and a serial number (S150).

Unique information which is intrinsic to the image processing device 1 is assigned to each information processing device 1. Thus, the information intrinsic to the image processing device 1 can be used as ID information of the image processing device 1. By combining the ID information of the image processing device 1 with a serial number, unique information can be generated, which can be used as the ID information of the external storage 20 which does not store the ID information.

When the external storage 20 does not have its original ID information, the image processing device 1 assigns new ID information for identifying the external storage 20 and stores the assigned ID information in the external storage 20 as well as in the registration data stored in the NVRAM 26 (S160).

After execution of S140 or S160, the process registers the user information, which is temporarily stored in the RAM 24, in association with the ID information with the registration data stored in the external storage 20 in the registration data stored in the NVRAM 26 (S170). After execution of S170, the registration process is terminated.

If there are a plurality of external storage 20, the above registration process is executed for each external storage 20 so that the ID information and a plurality of pieces of user information are registered with the registration data stored in the NVRAM 26. As shown in FIG. 7, if the external storage 20 contains the ID information, the process registers the ID information and the user information in the registration data in a related manner. If the external storage 20 does not contain its ID information, the process generates the ID information intrinsic to the external storage 20 and registers the generates ID information and the user information with the registration data in a related manner. Further, in the latter case, the process writes the generated ID information in the external storage 20.

Figure 4:
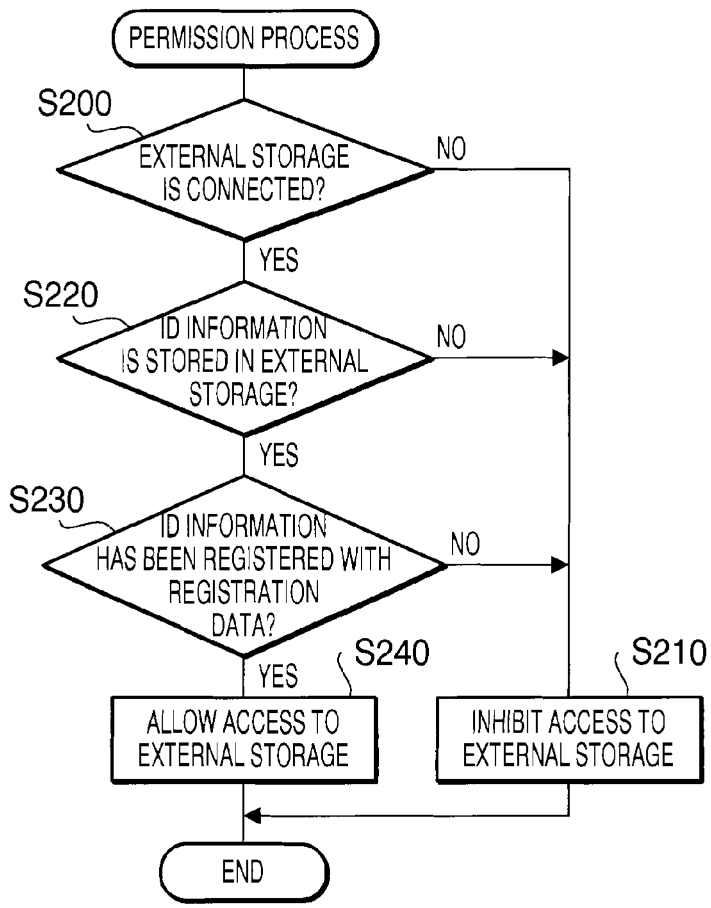
FIG. 4 is a flowchart illustrating a permission process according to aspects of the invention.

Next, the permission process will be described. FIG. 4 is a flowchart illustrating an example of the permission process. The permission process is an interruption process executed at every predetermined period. When the permission process is started, the process judges whether the external storage 20 is connected (S200). Whether the external storage 20 is connected or not is judged based on the detection result of the connection detecting unit 26. If the connection detecting unit 36 does not detect the connection of the external storage (S200: NO), the process inhibits access to the external storage 20 (S210). Then, the process is terminated.

If the connection detecting unit 36 detects that the external storage 20 is connected to the image processing device 1 (S200: YES), the process judges whether the connected external storage 20 contains the ID information (S220). As described above, the ID information is the originally assigned ID information or information generated in S160 and stored in S150.

If the process determines that the external storage 20 does not contain the ID information (S220: NO), the process inhibit access to the external storage 20 (S210). Then, the process is terminated.

If the process determines that the external storage 20 contains the ID information (S220: YES), the process judges whether the ID information stored in the external storage 20 has already been registered with the registration data (S230). If the ID information of the connected external storage 20 does not coincide with any one of the pieces of ID information registered with the registration data (S230: NO), the process determines that the ID information is not registered in the registration data. In this case, the process inhibits access to the external storage 20 (S210). Then, the process is terminated.

If the process determines that the ID information of the connected external storage 20 coincides with one of the pieces of the ID information registered with the registration data (S230: YES), the process determines that the ID information of the connected external storage 20 is registered with the registration data, and allows access to the external storage 20 currently connected to the information processing device 1 (S240).

Figure 5:
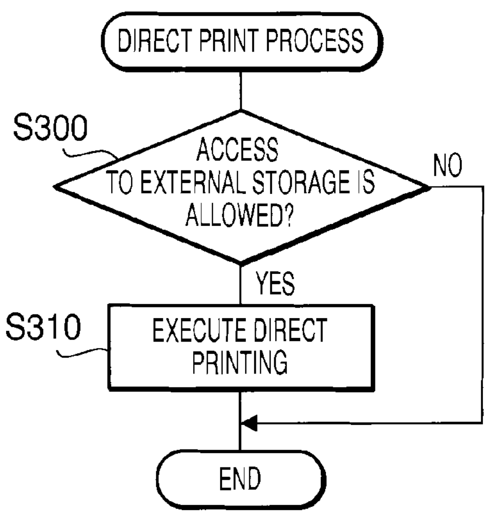
FIG. 5 is a flowchart illustrating a direct print process according to aspects of the invention.

Next, the direct printing process executed by the image processing device 1 will be described. FIG. 5 is a flowchart illustrating an example of the direct printing process according to the embodiment. It should be noted that, before the second printing process is executed, the print data should be stored in the external storage 20 in advance.

Storing the print data in the external storage 20 is done by the external device (PC) when the external storage 20 is connected to the external device (PC). For example, when application software such as a word processing application, a spreadsheet application, an image processing application or the like installed in the external device is executed, if a print menu of the application is selected by the user, and "output to file" is selected in the menu, the print data is stored in the external storage 20. The print data file is the PDL data file or a file suitable to the direct print (e.g., PDF, TIFF, JPEG, etc.).

That is, after creating text data, spreadsheet data etc. with applications (word processing application, spreadsheet application, etc.) of an external PC, the user may select a print menu of the application, and select printing. Then, the text data, spreadsheet data, etc. are converted into the PDL data by the printer driver software. The thus converted PDL data is stored in the external storage 20 as described above.

The PDF is a file format developed by Adobe system and widely used format. The PDF contains not only text, image information, but layout information, font information and the like and enables the direct printing without relying on an application. Further, the image file formats such as the TIFF format and JPEG format can be used as the data file format and are stored as they are when the print data is stored in the external storage 20. If the image processing device 1 is implemented with font data, a so-called text type print data can also be subject to the direct printing. Therefore, in such case, the print data of a TXT format may be stored in the external storage 20.

When the print data is stored in the external storage 20, without the external PC, images represented by the print data can be printed by the image processing device 1 capable of executing the direct printing. That is, for printing images represented by the print data stored in the external storage 20, the user may remove the external storage 20 from the external PC, and connect the external storage 20 to the image processing device 1.

When the user operates the selection keys 14 and/or execution key 10 and selects the "direct print" from the menu displayed on the displaying unit 8, the direct printing process is executed. When the direct printing process is started, the process firstly judges whether access to the external storage 20 is allowed (S300).

As described above, access to the external storage 20 is allowed or inhibited in S240 or S210, respectively. If the access to the external storage 20 is inhibited (S300: NO), the printing operation is not executed and the direct printing process is terminated.

If the access to the external storage 20 is allowed (S300: YES), the process executes the direct printing operation. In the direct printing operation, the process displays file names of the print data stored in the external storage 20 on the displaying unit 8, and requires the user to select print data to be printed.

When the user select the print data by the file name, the process rasterizes the selected print data and develops bit map data (i.e., image data) in a frame memory in the RAM 24. After developing the image data, the process controls the image forming unit 2 to print images on the recording sheets based on the image data. Further, the process refers to the ID information of the external storage 20, retrieves the user information related to the ID information registered with the registration data, and creates a print log. FIG. 8 shows an example of the print log. In this example, the print log contains, for each printing job, the user information and print information including date/time when the direct printing is executed and the number of copies of the printout. The print log is stored as print log data. When the printing is finished, the direct printing process is terminated.

If another external storage 20 is connected to the image processing device 1, the above described permission process (S200-S240) is executed, and depending on whether the ID information is stored in the external storage 20, access to the external storage 20 is allowed or inhibited.

When the direct printing process is executed, if access to the external storage 20 is allowed, images represented by the selected print data are printed, and print log containing the user information and print information is generated and stored. Accordingly, at a later stage, based on the print log, the user who executes the direct printing can be identified. If the direct printing is a paid operation, charge information can be obtained based on the print log. The print log can also be used to monitor whether unnecessary printing operations are executed.

According to the above configuration, if the access to the external storage 20 is inhibited, the CPU 21 cannot access the external storage 20 to read the print data, and thus the direct printing process cannot be executed. That is, if the external storage 20 of which the ID information is not registered with the registration data is used, the direct printing cannot be executed. Therefore, by not registering the ID information with the registration data, security of the data contained in the external storage 20 can be protected.

Figure 6:
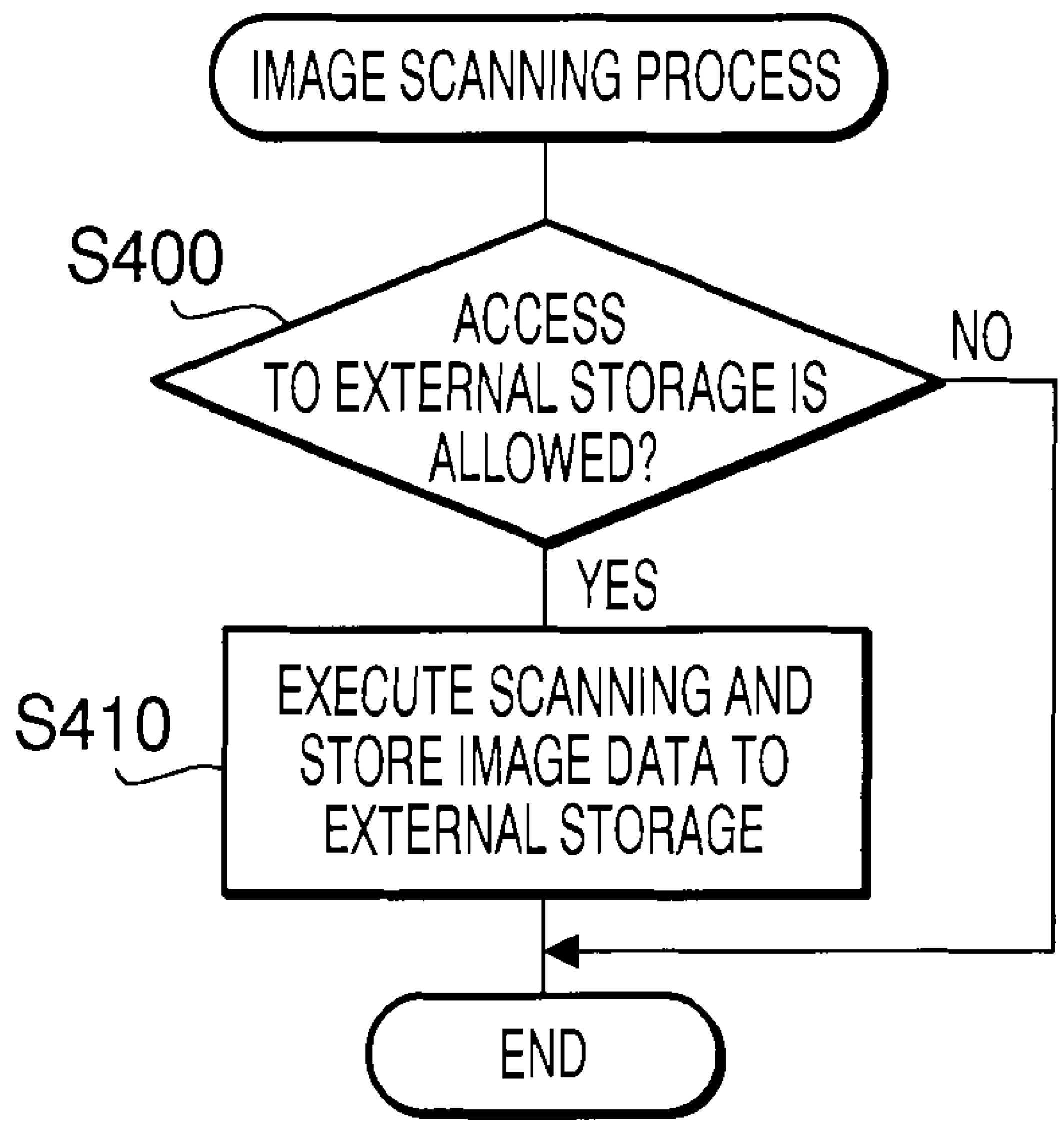
FIG. 6 is a flowchart illustrating a scanning process according to aspects of the invention.

Next, the image scanning process will be described. FIG. 6 is a flowchart illustrating an example of the image scanning process according to the embodiment.

When the user obtains image data of the original document using the scanning unit 4, the image scanning process is executed. When the user operates the selection keys 14 and execution key 10 to select the "image scanning" from the menu displayed on the displaying unit 8, the image scanning process is started.

When the image scanning process is started, the process judges whether the access to the externals storage 20 is allowed (S400).

As described above, access to the external storage 20 is allowed or inhibited in S240 or S210, respectively. If the access to the external storage 20 is inhibited (S400: NO), the image scanning process is terminated without executing a scanning operation.

If the access to the external storage 20 is allowed (S400: YES), the process controls the image scanning unit 4 to scan the image of the original document, and stores the image data in the external storage 20 (S410). After storing the image data in the external storage 20, the image scanning process is terminated.

As described above, the image data representing the scanned image is stored to the external storage 20 only when the access to the external storage 20 is allowed. Therefore, when the security of the original document is to be protected, if the external storage 20 does not contain the ID information registered with the registration data, the image data cannot be stored in the external storage 20. Accordingly, the image data will not go outside by means of the external storage 20.

It should be noted that, although the invention is described based on the exemplary embodiment, the invention should not be limited to the configuration of the embodiment. Various modifications can be made without departing from the scope of the invention.

What is claimed is:

1. An image processing device to which an external storage is detachably connectable, comprising:

an inputting unit configured to allow a user to input user information;

a processing unit;

memory that stores computer-executable instructions that, when executed by the processing unit, provide:

a registration unit configured to register ID information intrinsic to the external storage and the user information input through the inputting unit with registration data in a related manner; and a permission unit configured to retrieve the ID information from the external storage and permit access to the external storage connected to the image processing device only if-in a case that the retrieved ID information is included in the registered ID information which is registered with the registration data;

an image forming unit configured to read print data stored in the external storage in a case that access to the external storage is permitted by the permission unit, print images represented by the print data read from the external storage, and create a print log including user information related to the ID information of the external storage; and storage for storing the print log, wherein the computer-executable instructions that, when executed by the processing unit, further provide a recording unit configured to record the print log in the storage in association with the ID information and the user information for each print job.

2. The image processing device according to claim 1, wherein the computer-executable instructions, when executed by the processing unit, further provide an authentication unit configured to perform authentication prior to registration of the ID information and the user information with the registration data, the authentication unit enables registration of the ID information and the user information by the registration unit only when the authentication is successfully completed.

3. The image processing device according to claim 2, wherein the authentication unit performs the authentication by comparing a password input by a user with a predetermined password, and wherein the authentication unit enables registration of the ID information and the user information only when the input password coincides with the predetermined password.

4. The image processing device according to claim 1, further comprising an image scanning unit configured to scan an image of an original document and store image data representing the scanned image in the external storage.

5. The image processing device according to claim 1, wherein the registration unit registers the ID information preliminarily assigned to and stored in the external storage with the registration data as the ID information of the external storage.

6. The image processing device according to claim 1, wherein the registration unit generates unique ID information in a case that ID information is not preliminarily assigned to the external storage, the registration unit registers the unique ID information with the registration data and stores the unique ID information in the external storage as the ID information of the external storage.

7. A method of processing data for an image processing device to which an external storage is detachably connectable, comprising the steps of:

allowing a user to input user information;

registering ID information intrinsic to the external storage and the user information input by the user with registration data in a related manner;

retrieving the ID information from the external storage and permitting access to the external storage connected to the image processing device only in a case that the retrieved ID information is included in the registered ID information which is registered with the registration data;

reading print data stored in the external storage in a case that access to the external storage is permitted;

printing images represented by the print data read from the external storage when access to the external storage is permitted;

creating a print log including user information related to the ID information of the external storage when access to the external storage is permitted; and recording the print log in a storage in association with the ID information and the user information for each print job.

8. The method according to claim 7, further comprising the step of performing authentication prior to registration of the ID information and the user information with the registration data, wherein the step of authenticating enables registration of the ID information and the user information only when the authentication is successfully completed.

9. The method according to claim 8, wherein the step of authenticating performs the authentication by comparing a password input by a user with a predetermined password, registration of the ID information and the user information being enabled only when the input password coincides with the predetermined password.

10. The method according to claim 7, further comprising the step of scanning an image of an original document and storing image data representing the scanned image in the external storage.

11. The method according to claim 7, wherein the step of registering registers the ID information preliminarily assigned to and stored in the external storage with the registration data as the ID information of the external storage.

12. The method according to claim 7, wherein the step of registering generates unique ID information in a case that ID information is not preliminarily assigned to the external storage, the unique ID information being registered with the registration data and also stored in the external storage as the ID information of the external storage.

13. A non-transitory computer accessible recording medium storing a program which causes a computer, when executed by the computer, to function as an image processing device to which an external storage is detachably connectable, the program including instructions of:

allowing a user to input user information;

registering ID information intrinsic to the external storage and the user information input by the user with registration data in a related manner;

retrieving the ID information from the external storage and permitting access to the external storage connected to the image processing device only in a case that the retrieved ID information is included in the registered ID information which is registered with the registration data; and reading print data stored in the external storage in a case that access to the external storage is permitted;

printing images represented by the print data read from the external storage when access to the external storage is permitted;

creating a print log including user information related to the ID information of the external storage when access to the external storage is permitted; and recording the print log in a storage in association with the ID information and the user information for each print job.

14. The recording medium according to claim 13, wherein the program further includes instructions for performing authentication prior to registration of the ID information and the user information with the registration data, wherein the instruction of authenticating enables registration of the ID information and the user information only when the authentication is successfully completed.

15. The recording medium according to claim 13, wherein the program includes instructions for scanning an image of an original document and storing image data representing the scanned image in the external storage.

* * * * *

UNITED STATES PATENT AND TRADEMARK OFFICE

CERTIFICATE OF CORRECTION

PATENT NO. : 8,042,174 B2
APPLICATION NO. : 12/034980
DATED : October 18, 2011
INVENTOR(S) : Hiroshi Hattori It is certified that error appears in the above-identified patent and that said Letters Patent is hereby corrected as shown below:

Column 8, Claim 1, Line 50:
Please delete "if-in" and insert -- in --

Signed and Sealed this
Twenty-fourth Day of April, 2012

David J. Kappos
*Director of the United States Patent and Trademark Office*